Jan. 11, 1927.

L. S. BESSONETT 1,613,738

FITTING FOR DRAINING LUBRICANTS FROM VEHICLE MOTOR CASES

Filed Jan. 27, 1925

Inventor
Leland S. Bessonett
By Lyon & Lyon
Attorneys

Patented Jan. 11, 1927.

1,613,738

UNITED STATES PATENT OFFICE.

LELAND S. BESSONETT, OF SAN FRANCISCO, CALIFORNIA, ASSIGNOR, BY MESNE ASSIGNMENTS, TO STANDARD OIL COMPANY OF CALIFORNIA, OF SAN FRANCISCO, CALIFORNIA, A CORPORATION OF DELAWARE.

FITTING FOR DRAINING LUBRICANTS FROM VEHICLE MOTOR CASES.

Application filed January 27, 1925. Serial No. 5,177.

This invention relates to a fitting adapted to be connected to a drainage outlet of a lubricant reservoir of a particular model motor vehicle, and is more particularly directed to a fitting that may be connected to the oil containing case of a vehicle motor at the drainage outlet provided to enable a free and unrestricted withdrawal of the lubricant and sediment from the vehicle motor by any suitable means, such as that illustrated in the copending application of Henry Deward Collier, for system and apparatus for drawing spent lubricant from motor vehicles, filed Feb. 9, 1924, Ser. No. 691,861, when it is desired to introduce new lubricant into the motor case.

An object of this invention is to provide a fitting adapted to replace the original drain cock fitting provided for draining lubricant from a common type vehicle motor, so that a fluid tight union may be made between a discharge tube and the outlet or port provided in the engine case.

An object of this invention is to provide a fitting so constructed and adapted to be installed that lubricants and sediments will be removed as well as, and if possible more effectively, than by the means provided by the vehicle manufacturer.

An object of this invention is to provide a fitting which when installed shall be such that the road clearance will not be materially changed by the attachment thereof.

An object of this invention is to provide a fitting the installation of which is such that it does not interfere with the functioning of any other part or system of the vehicle motor to which it is attached.

An object of this invention is to provide a fitting that is simple and dependable so that it can be properly installed by inexperienced persons and at the same time not introduce any additional liability to oil leakage.

Further objects and advantages of this invention will be apparent from the following detailed description of a preferred embodiment thereof illustrated in the accompanying drawings:

Figure 1:
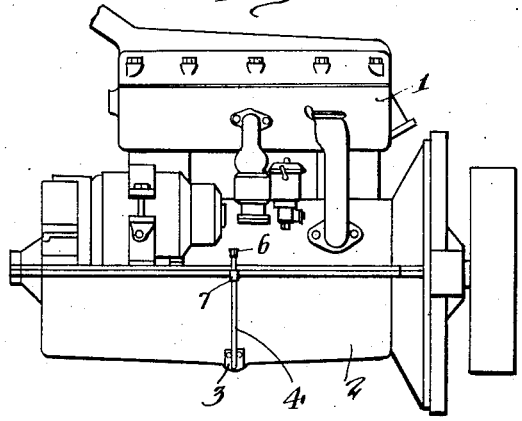
Fig. 1 is a side elevation of a vehicle motor illustrating the position and attachment of a fitting in front elevation embodying this invention.
Figure 2:
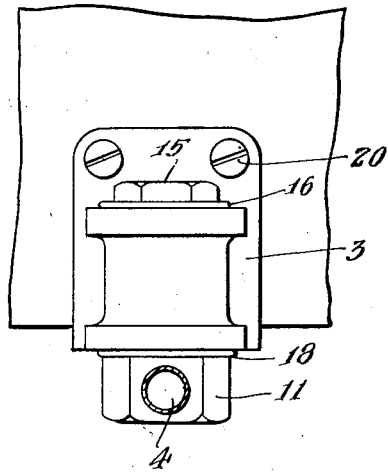
Fig. 2 is an enlarged front elevation of the fitting illustrated in Fig. 1, illustrating the same attached to a fragment of a motor vehicle case, the drain tube being broken away.
Figure 3:
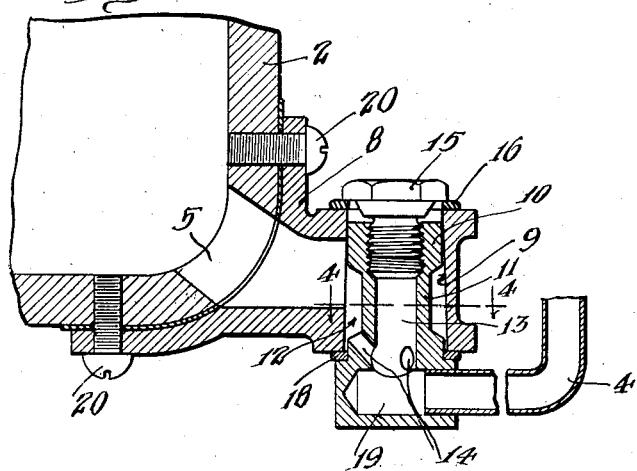
Fig. 3 is a sectional elevation of the fitting as illustrated in Fig. 2, illustrating the drainage tube broken away and the cap plug in side elevation.
Figure 5:
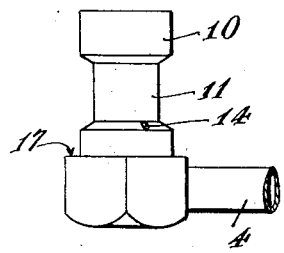
Fig. 5 is a side elevation of drain plug embodied in this invention.
Figure 4:
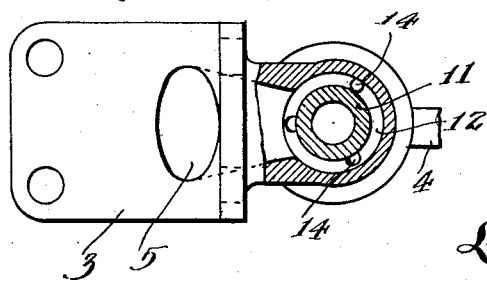
Fig. 4 is a plan view of the fitting illustrated detached from the case and showing the hollow plug in section taken substantially on the line 4—4 of Fig. 3, and without the drain tube.

1 illustrates a vehicle motor of common make and model having a crankcase 2 to which a fitting 3 is secured at or near the lowest point thereof, which fitting 3 provides a fluid tight connection or union between the discharge tube 4 and the outlet port 5 on the crankcase so that the lubricant in the crankcase and any sediment formed therein may be freely withdrawn. The upper end of the discharge tube 4 is preferably of malleable metal, such that when the same is bent or formed into the position described that it will remain in this position and in order to insure a secure and rigid holding of the discharge tube 4 the same is clamped to the vehicle motor as illustrated at 7. The discharge tube 4 is of sufficient size to convey the lubricant with a reasonable hydraulic loss. It is small enough to be easily handled and is also small enough so that the air passing through it after the lubricant is all discharged from the container or crankcase 2, will tend to pick up any lubricant which may remain in the passages and carry it along to the ultimate discharge point.

It has been found that the best results are obtained when the discharge tube has an internal diameter of approximately one-quarter of an inch. 8 illustrates the original fitting adapted to be secured to the lubricant container at or near the bottom and having a tapered draincock opening 9 communicating with the outlet 5. 10 illustrates a specially constructed plug adapted to replace the original draincock plug in the opening 9 and providing communication of the outlet 5 to the discharge conduit 4. The plug 10 has a reduced section 11 providing a chamber 12 between the plug 10 and walls of the opening 9, and which chamber 12 is in open communication with the outlet 5. The plug 10 has a bore 13 concentric with the horizontal axis and extending from the top to a point near the bottom and communicating through the radial holes 14 with the chamber 12.

The drain plug 10 is held within the bore 13 so as to provide a means of communication of the outlet 5 with the drain tube 4 and in fluid tight relation therewith by the preferred means of a cap 15 screw threaded within the upper portion of the plug 10, and being adapted to engage a washer or gasket 16, to force the circumferential shoulder 17 of the plug 10 into engagement with the washer or gasket 18.

At the lower end of the bore 13 is a second bore 19 providing a lower chamber into which the discharge conduit or tube 4 is inserted and securely held in place by any suitable means such as welding, brazing, or the like. The original draincock fitting 8 is secured to the case 2 by any suitable means, such as the cap screw illustrated at 20.

The chambers provided by the central passage of the fitting 8, the annular recess 12 formed in the plug 10 and the bore 19 formed at the lower end of the plug provide through the ports 14 an open communication at all times between the outlet 5 and the tube 4 so that the lower chamber formed by the bore 19 will act as a detritus receiving sump or well into which the solid impurities, such as carbon, small fragments of steel and the like, will drain from the lubricating oil and hence be in position to be drawn directly through the tube 4 when the suction is applied to the tube 4 and will therefore be thoroughly washed from the engine by the flow of oil or lubricant as the same is drawn through the outlet 5. This sump, it will be noted, is considerably below the lowest point of the crank-case 2.

Having fully described a preferred embodiment of this invention, it is to be understood that applicant does not wish to be limited to the exact construction herein set forth which may be obviously varied in detail without departing from the spirit of the invention as set forth in the appended claims.

I claim:

1. The combination with a lubricant containing case having a drainage outlet, of a chamber secured to the side of the case in registration with the outlet, a hollow plug secured within and fixed against rotation within said chamber in fluid tight relation, and a suction tube secured to the hollow plug in fixed relation and extending vertically from the said plug.

2. The combination with a lubricant containing case of a motor vehicle, said case having a drainage outlet of a chamber secured to the side of the case in registration with the outlet and provided with a tapered bore, a non-rotatable hollow tapered plug fitting the bore, a cap threaded into the plug to hold the plug in fluid tight relation within the said bore, and a suction tube secured to the said hollow plug in communication with the bore of the plug and extending vertically upward from the plug.

3. The combination with a lubricating containing case having a drainage outlet, of a chamber secured to the side of the case in registration with the outlet and provided with a tapered bore, a hollow plug fitting the bore, means for holding the plug in fluid tight relation within said bore and against rotation, and a suction tube secured to the hollow plug.

4. The combination with the lubricant containing case of a motor vehicle having a drainage outlet of a chamber secured to the said case in registration with the outlet and provided with a vertical tapered bore, a hollow plug fitting the bore and means for holding the said plug in fluid tight relation within said bore, a tube secured to the hollow plug and a circumferential recess formed in the said plug in open communication with the said outlet ports formed in the plug for maintaining open communication through the annular recess with the said outlet and the said tube.

5. The combination with a lubricant containing case of a motor vehicle, having a drainage outlet, of a chamber secured to the said case in registration with the outlet and provided with a vertical tapered bore, a tapered plug secured within said bore in fluid tight relation, said plug having a reduced section providing a chamber in combination with the first named chamber, and a suction tube secured to the hollow plug and communicating with the latter of said chambers the said chambers providing a detritus receiving well maintained in open communication with the said drainage outlet and the said tube.

6. The combination with a lubricant containing case of a motor vehicle, having a drainage outlet at or near its lowest point, of a chamber secured to the side of the case in registration with the outlet and providing a lubricant sump, and a tube secured to said chamber and communicating with said sump, the said tube extending upwardly and being secured to the outside of the crank-case case to form a suction connection.

7. The combination with a lubricant containing case of a motor vehicle having a drainage outlet at or near its lowest point of a chamber secured to the side of the case in registration with the outlet and providing a lubricant sump below the lowest level of lubricant in the case and a tube secured to said chamber and communicating with the sump, the said tube extending upwardly and being secured to the outside of the crankcase to form a suction connection.

8. The combination of a lubricant containing case of a motor vehicle having a drainage outlet at or near its lowest point, a fitting secured to the case over the said outlet and providing a chamber in open communication with the said outlet, a plug removably mounted in said fitting, a vertically extending suction tube secured to the frame and extending vertically upward from the said outlet, a port formed through the plug to provide open communication through the said chamber with the said drainage outlet and the said chamber and port providing a detritus receiving sump open to the said tube.

9. The combination with a lubricant containing case of a motor vehicle having a drainage outlet at or near its lowest point, a fitting secured to the case over the said opening and providing a chamber in open communication with the said outlet, a vertical plug removably mounted in the said fitting, a port formed through the plug to provide open communication through the chamber with the said drainage outlet, a bore formed at the lower end of the said plug into which a suction tube extends to provide a detritus sump in open communication with the said tube and with the said drainage outlet.

10. The combination with a lubricant containing case of a motor vehicle having a drainage outlet at or near its lowest point, a fitting secured to the case over the said outlet and providing a chamber in open communication with the said outlet, a plug mounted in the said fitting, the plug having a section of reduced diameter and a port formed therethrough in open communication with the annular recess provided by the reduced portion, a vertically extending suction tube secured to the said fitting in open communication through the said port, through the annular recess and chamber with the drainage outlet, and means for securing the said plug within the said fitting in fluid tight relation.

Signed at San Francisco, California, this Seventeenth day of January 1925.

LELAND S. BESSONETT.